Patented Jan. 6, 1942

2,269,166

UNITED STATES PATENT OFFICE 2,269,166

POLYVINYL ACETAL RESIN

Martti Salo, Rochester, N. Y., assignor to Eastman Kodak Company, Rochester, N. Y., a corporation of New Jersey No Drawing. Application March 21, 1939, Serial No. 263,185. In Great Britain March 22, 1938

12 Claims. (Cl. 260—73)

This invention relates to polyvinyl acetal resins and more particularly to polyvinyl acetal resins having improved resistance to moisture.

Simple polyvinyl acetal resins (i. e. those in which the acetal linkages are formed from but one kind of acetal group) have been prepared from polyvinyl alcohols by condensation of aldehydes therewith, in the presence of an acetal condensation catalyst. Simple polyvinyl acetal resins have also been prepared by concomitantly deesterifying a polyvinyl ester and condensing the deesterified product with an aldehyde, in the presence of a deesterification catalyst, the deesterification catalyst serving also to accelerate the condensation of the deesterified product with the aldehyde.

The polyvinyl acetal resins prepared from acetaldehyde are probably the most interesting of the polyvinyl acetal resins in which the acetal linkages are formed from but a single saturated aliphatic aldehyde. These polyvinyl acetaldehyde acetals appeared to be useful for a variety of purposes in the plastic field. For example, such resins can be cast from ordinary simple solutions into the form of transparent film or sheet of fairly low thermoplasticity. However, the film or sheet is too brittle to be adapted commercially to certain uses; for instance, the film or sheet is too brittle to serve as a support for light-sensitive photographic coatings in the manufacture of cinematographic film. Efforts to decrease the brittleness of each resin by changing the chemical composition thereof, viz. by increasing the hydroxyl group content, have resulted in resins which are too water-susceptible to be employed commercially in the manufacture of cinematographic film.

Film or sheet made from polyvinyl butyraldehyde acetal resins is fairly resistant to moisture, but is too thermoplastic to be employed in the manufacture of cinematographic film.

It is also known that polyvinyl acetaldehyde acetal resins can be improved by introducing butyraldehyde acetal groups into the resin, so that from about 20 to about 40 mole percent of the total acetal groups in the resin are butyraldehyde acetal groups. Film or sheet made from such butyraldehyde-acetaldehyde acetal resins is of lower moisture susceptibility than film or sheet made from polyvinyl acetaldehyde acetal resins and of lower thermoplasticity than film or sheet made from polyvinyl butyraldehyde acetal resins.

It is also known that polyvinyl acetaldehyde acetal resins can be improved by introducing benzaldehyde acetal groups into the resin, so that from about 20 to about 40 mole percent of the total acetal groups in the resin are benzaldehyde acetal groups. Film or sheet made from such benzaldehyde-acetaldehyde acetal resins is of lower moisture susceptibility than film or sheet made from polyvinyl acetaldehyde acetal resins and of lower thermoplasticity than film or sheet made from polyvinyl butyraldehyde acetal resins. In addition film or sheet made from the aforesaid benzaldehyde-acetaldehyde acetal resins has other special and outstanding characteristics, e. g. a remarkable rigidity.

I have now found that polyvinyl acetal resins in which the acetal linkages are formed from saturated aliphatic acetal groups containing from one to four carbon atoms can be considerably improved by introducing halogenated and/or nitrated benzaldehyde acetal groups into the resin, so that a substantial portion, i. e. at least about 10 mole percent, of the acetal groups are halogenated and/or nitrated benzaldehyde acetal groups, while the remainder are saturated aliphatic aldehyde acetal groups. Film or sheet made from my new resins has especially low moisture susceptibility, in many cases being superior to film or sheet made from the aforesaid known resins in this respect, while, at the same time, possessing fairly low thermoplasticity and good rigidity characteristics.

It is an object of my invention, therefore, to provide new resins. A further object is to provide a process for preparing such new resins. A further object is to provide film or sheet of my new resins. Other objects will become apparent hereinafter.

According to my invention, I prepare my new resins by condensing a polyvinyl alcohol with a saturated aliphatic aldehyde containing from one to four carbon atoms and with a halogenated and/or nitrated benzaldehyde, in the presence of an acetal condensation catalyst. More advantageously, I prepare my new resins by concomitantly deesterifying a polyvinyl ester and condensing the deesterified product with a saturated aliphatic aldehyde containing from one to four carbon atoms and with a halogenated and/or nitrated benzaldehyde, in the presence of an acid deesterification catalyst.

Of the total aldehydes which I employ in preparing one of my new resins, advantageously from about 20 to about 40 mole percent should be halogenated and/or nitrated benzaldehydes. The total aldehydes employed is advantageously in excess of that actually needed to combine with all the hydroxyl groups in the polyvinyl alcohol or deesterified polyvinyl ester; excesses up to 100% are advantageously employed. The condensation of the total aldehydes with the polyvinyl alcohol or deesterified polyvinyl ester should be continued until the amount of hydroxyl groups remaining uncombined is equivalent to not more than about 25% by weight of polyvinyl alcohol and advantageously until the amount of hydroxyl groups remaining uncombined is equivalent to not more than about 15% by weight of polyvinyl alcohol, based on the weight of the finished polyvinyl acetal resin. In the case of employing a polyvinyl ester as a starting material deesterification and condensation should be continued until the amount of ester groups remaining is equivalent to not more than about 20% by weight of polyvinyl ester and advantageously until the amount of ester groups remaining is equivalent to not more than about 10%, or even 5% by weight by polyvinyl ester, based on the weight of the finished polyvinyl acetal resin.

As saturated aliphatic aldehyde containing 1 to 4 carbon atoms, the following are especially useful in practicing my invention; formaldehyde, acetaldehyde, propionaldehyde, butyraldehyde and isobutyraldehyde. As halogenated and/or nitrated benzaldehydes, the following are especially useful in practicing my invention: o- and p-chlorobenzaldehyde and m- and p-nitrobenzaldehyde. Other halogenated and/or nitrated benzaldehydes are: 2,4-dichlorobenzaldehyde, o-bromobenzaldehyde, 2,4-dinitrobenzaldehyde and 2-chloro-4-nitrobenzaldehyde for example.

The following examples will serve to illustrate the manner of obtaining my new resins. These examples are not intended to limit my invention.

EXAMPLE 1.—*Polyvinyl acetaldehyde p-Nitrobenzaldehyde Acetal resin*

150 g. (1.74 mol.) of polyvinyl acetate (of viscosity 25) were dissolved in 375 g. of 95% ethyl alcohol. To this solution were added with stirring 79 g. (0.52 mol.) of p-nitrobenzaldehyde and 77 g. (1.75 mol.) of paraldehyde and 37.5 g. of hydrochloric acid (sp. g. 1.18). The resulting mixture was allowed to stand about 4 days, at about 40° C. At the end of this time, the reaction mixture was diluted with about one and one-half times its volume of a 1:1 (volume) mixture of acetic acid and ethyl alcohol. The diluted reaction mixture was poured into cold water to precipitate the resin. The precipitated resin was thoroughly washed with water for about 48 hours and dried at from 140° to 160° F. for about 48 hours. The resin contained an acetate group content equivalent to about 2.55% by weight of polyvinyl acetate and a hydroxyl group content equivalent to about 6.2% by weight of polyvinyl alcohol. Of the total aldehydes in the reaction mixture (2.27 mol.) about 23 mole percent (0.52 mol.) was p-nitrobenzaldehyde.

EXAMPLE 2.—*Polyvinyl acetaldehyde m-Nitrobenzaldehyde Acetal resin*

150 g. (1.74 mol.) of polyvinyl acetate (of viscosity 25) were dissolved in about 375 g. of 95% ethyl alcohol. To the resulting solution were added, with stirring, 70.2 g. (0.53 mol.) of m-nitrobenzaldehyde, 53.8 g. (1.2 mol.) of paraldehyde and 37.5 g. of hydrochloric acid (of sp. g. 1.18). The resulting mixture was allowed to stand at about 40° C. for about 4 days. At the end of this time, the reaction mixture was diluted with about 1¼ times its volume of 95% ethyl alcohol. The diluted reaction was poured into cold water to precipitate the resin. The precipitated resin was thoroughly washed with cold water (for about 48 hours). The resin was finally dried at 140° to 160° F. for about 48 hours. The resin was finally dried at 140° to 160° F. for about 48 hours.

The resin contained an acetate group content equivalent to about 4.0% by weight of polyvinyl acetate and a hydroxyl group content equivalent to about 5.3% by weight of polyvinyl alcohol. Of the total aldehyde (1.73 mol.) in the reaction mixture, about 30 mole percent (0.53 mol.) was m-nitrobenzaldehyde.

EXAMPLE 3.—*Polyvinyl acetaldehyde m-Nitrobenzaldehyde Acetal resin*

150 g. (1.74 mol.) of polyvinyl acetate (of viscosity 25) were dissolved in about 375 g. of 95% ethyl alcohol. To this solution were added 52.8 g. (0.35 mol.) of m-nitrobenzaldehyde, 61.4 g. (1.4 mol.) of paraldehyde and 37.5 g. of hydrochloric acid (sp. g. 1.18), with stirring. The resulting mixture was allowed to stand at about 40° C. for about 4 days. At the end of this time, the reaction mixture was diluted with about 1¼ times its volume of 95% ethyl alcohol. The diluted reaction mixture was poured into cold water to precipitate the resin. The precipitated resin was thoroughly washed with cold water (for about 48 hours). The washed resin was then dried at 140° to 160° F. for about 48 hours. The resin contained an acetate group content equivalent to about 1.6% by weight of polyvinyl acetate and a hydroxyl group content equivalent to about 5.6% by weight of polyvinyl alcohol. Of the total aldehydes (1.75 mol.) in the reaction mixture, about 20 mole percent (0.35 mol.) were m-nitrobenzaldehyde.

EXAMPLE 4.—*Polyvinyl acetaldehyde o-Chlorobenzaldehyde Acetal resin*

150 g. (1.74 mol.) of polyvinyl acetate (of viscosity 25) were dissolved in 375 g. of 95% ethyl alcohol. To this solution were added, with stirring, 49 g. (0.34 mol.) of o-chlorobenzaldehyde, 61 g. (1.4 mol.) of paraldehyde and 37.5 g. of hydrochloric acid (of sp. g. 1.18). The resulting mixture was allowed to stand, at about 40° C., for about 5 days. At the end of this time, the reaction mixture was diluted with about one and one-half times its volume of a 1:1 (by volume) mixture of acetic acid and ethyl alcohol. The diluted reaction mixture was then poured into cold water to precipitate the resin. The precipitated resin was thoroughly washed with water (for about 48 hours) and finally dried at 140° to 160° F. (for about 48 hours). The resin contained an acetate group content equivalent to about 2.2 percent by weight of polyvinyl acetate and a hydroxyl group content equivalent to about 8.8% by weight of polyvinyl alcohol. Of the total aldehydes (1.74 mol.) in the reaction mixture, about 20 mole percent (0.34 mol.) was o-chlorobenzaldehyde.

EXAMPLE 5.—*Polyvinyl acetaldehyde o-Chlorobenzaldehyde Acetal resin*

150 g. (1.74 mol.) of polyvinyl acetate (of viscosity 25) were dissolved in 375 g. of 95% ethyl alcohol. To this solution were added 73 g. (0.52 mol.) of o-chlorobenzaldehyde, 54 g. (1.2 mol.) of paraldehyde and 37.5 g. of hydrochloric acid (of ap. g. 1.18), with stirring. The resulting mixture was allowed to stand, at about 40° C., for about 5 days. At the end of this time, the reaction mixture was diluted with about one and one-half times its volume of a 1:1 (by volume) mixture of acetic acid and ethyl alcohol. The diluted reaction mixture was then poured into cold water to precipitate the resin. The precipitated resin was thoroughly washed with water (for about 48 hours) and finally dried at 140° to 160° F. (for about 48 hours). The resin contained an acetate group content equivalent to about 2.2% by weight of polyvinyl acetate and a hydroxyl group content equivalent to about 8.7% by weight of polyvinyl alcohol. Of the total aldehyde (1.72 mol.) in the reaction mixture, about 30 mole percent (0.52 mol.) was o-chlorobenzaldehyde.

EXAMPLE 6.—*Polyvinyl formaldehyde o-Chlorobenzaldehyde Acetal resin*

150 g. (1.74 mol.) of polyvinyl acetate (of viscosity 25) were dissolved in about 450 cc. of 70% (by weight) aqueous acetic acid. To this solution were added 46.5 g. (0.33 mol.) of o-chlorobenzaldehyde, 23.2 g. (0.74 mol.) of paraformaldehyde and 37.5 g. of hydrochloric acid (of sp. g. 1.18), with stirring. The resulting mixture was allowed to stand at about 40° C. for about 5 days. At the end of this time, the reaction mixture was diluted with 1½ times its volume of glacial acetic acid and the diluted reaction mixture was poured into cold water to precipitate the resin. The precipitated resin was thoroughly washed with water (about 48 hours) and finally dried at 140° to 160° F. for about 48 hours. The resin contained an acetate group content equivalent to about 13.8% by weight of polyvinyl acetate and a hydroxyl group content equivalent to about 8.1% by weight of polyvinyl alcohol of the total aldehydes (1.07 mol.) in the reaction mixture, about 30 mole percent (0.33 mol.) was o-chlorobenzaldehyde.

EXAMPLE 7.—*Polyvinyl propionaldehyde o-Chlorobenzaldehyde Acetal resin*

150 g. (1.74 mol.) of polyvinyl acetate (of viscosity 25) were dissolved in 375 g. of 95% ethyl alcohol. To this solution were added, with stirring, 73.5 g. (0.52 mol.) of o-chlorobenzaldehyde, 70.7 g. (1.22 mol.) of propionaldehyde and 37.5 g. of hydrochloric acid (of sp. g. 1.18). The resulting mixture was allowed to stand at about 40° C. for about 4 days. At the end of this time the reaction mixture was diluted with 1½ times its volume of a 1:1 (by volume) mixture of acetone and acetic acid. The diluted reaction mixture was poured into cold water to precipitate the resin. The precipitated resin was thoroughly washed with cold water (for about 48 hours) and finally dried at from 140° to 160° F. at about 48 hours. The resin contained an acetate group content equivalent to about 7.3% by weight of polyvinyl acetate and a hydroxy group content equivalent to about 7.9% by weight of polyvinyl alcohol. Of the total aldehydes (1.74 mol.) in the reaction mixture, about 30 mole percent (0.52 mol.) was o-chlorobenzaldehyde.

EXAMPLE 8.—*Polyvinyl butyraldehyde o-Chlorobenzaldehyde Acetal resin*

150 g. (1.74 mol.) of polyvinyl acetate (of viscosity 25) were dissolved in 375 g. of 95% ethyl alcohol. To this solution were added, with stirring, 73.5 g. (0.52 mol.) of o-chlorobenzaldehyde, 87.9 g. (1.22 mol.) of butyraldehyde and 37.5 g. of hydrochloric acid (sp. g. 1.18). The resulting mixture was allowed to stand at about 40° C. for about 4 days. At the end of this time, the reaction mixture was diluted with about twice its volume of acetic acid and the diluted reaction mixture was poured into water to precipitate the resin. The precipitated resin was thoroughly washed with cold water (for about 48 hours), after which it was dried at 140° to 160° F. (for about 48 hours). The resin contained an acetate group content equivalent to about 7.9% by weight of polyvinyl acetate and a hydroxyl group content equivalent to about 6.7% by weight of polyvinyl alcohol. Of the total aldehydes (1.74 mol.) in the reaction mixture, about 30 mole percent (0.52 mol.) was o-chlorobenzaldehyde.

EXAMPLE 9.—*Polyvinyl acetaldehyde o-Chlorobenzaldehyde Acetal resin*

150 g. (1.74 mol.) of polyvinyl acetate (of viscosity 25) were dissolved in about 375 g. of 95% ethyl alcohol. To this solution were added 98.4 g. (0.7 mol.) of o-chlorobenzaldehyde, 46.1 g. (1.05 mol.) of paraldehyde and 37.5 g. of hydrochloric acid (of sp. g. 1.18), with stirring. The resulting mixture was allowed to stand at about 40° C. for about five days. At the end of this time, the reaction mixture was diluted with three to four times its volume of 95% ethyl alcohol. The diluted reaction mixture was poured into cold water to precipitate the resin. The precipitated resin was thoroughly washed with cold water (for about 48 hours). The washed resin was then dried at 140° to 160° F. for about 48 hours. The resin contained an acetate group content equivalent to less than 5 percent by weight of polyvinyl acetate and a hydroxyl group content equivalent to less than 15 percent by weight of polyvinyl alcohol. Of the total aldehydes (1.75 mol.) in the reaction mixture, about 40 mole percent (0.7 mol.) were o-chlorobenzaldehyde.

Heat accelerates the formation of my new resins, but temperatures over 70° C. are advantageously avoided. A temperature range of from about 20° to about 50° C. is preferable.

As acid deesterification catalysts, mineral acids are advantageously employed. Hydrochloric acid is most advantageously employed, since the resins obtained when it is employed are ordinarily more stable than those obtained when sulfuric acid is employed, for example. Trichloracetic acid or organic sulfonic acids can be used.

As acetal condensation catalysts, acids, particularly mineral acids, are likewise advantageously employed. When preparing my new resins by concomitantly deesterifying a polyvinyl ester and condensing the deesterification product with aldehydes, the acid catalyst accelerates both deesterification and condensation. Hydrochloric acid and sulfuric acid are especially useful. As catalysts which promote acetal condensations, but which are less useful as deesterification catalysts, zinc chloride and phosphoric acid may be mentioned.

The resins are advantageously prepared in a solution from which they can be precipitated by diluting the solution with water (e. g. by pouring the solution into water), as illustrated in the above examples. The solvents are employed in conjunction with water and are advantageously water-miscible solvents, such as methyl, ethyl or isopropyl alcohols, acetic or propionic acids, or 1,4-dioxane for example.

The aldehydes can be employed in their monomeric or polymeric forms or in the form of a derivative which yields the aldehyde in the reaction mixture, such as the diethyl acetal of acetaldehyde for example.

Any polyvinyl ester can be employed in preparing my new resins; for example polyvinyl acetate, polyvinyl chloroacetate or polyvinyl propionate. Polyvinyl acetate is especially satisfactory. The viscosity of the polyvinyl ester may vary widely. In the above examples the viscosities of the polyvinyl esters are stated as viscosities, in centipoises, of their molar solutions (86.05 grams per liter in the case of polyvinyl acetate) in benzene at about 20° C.

To prepare film or sheet from my new resins. I first dissolve about 1 part of the resin in from 3 to 4 parts of a suitable solvent, such as a mixture of 90% (by volume) ethylene dichloride and 10% methyl alcohol, ethyl acetate, a mixture of 90% (by volume) benzene and 10% methyl alcohol or a mixture of 90% (by volume) toluene and 10% methyl alcohol. If necessary larger amounts of solvent may be employed. Such a solution is then cast onto a film-forming surface, such as a metal or glass plate or a revolving drum, to desired thickness and the resulting film or sheet is allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of low moisture susceptibility and fairly low thermoplasticity. The resulting film or sheet can be coated directly with photographic emulsions or can be coated first with resinous or other known "subbing materials" before the photographic emulsion is applied.

The following table shows the moisture susceptibility of film or sheet made from representative of my new resins as compared with film or sheet made from representative of the prior art resins.

| Resin | Mole percent of aldehydes | Hydroxyl | Acetate | Moisture susceptibility (swell and shrink amplitude) |
|---|---|---|---|---|
| Ex. 4 | o-Chlorobenzaldehyde—20, acetaldehyde—80 | 8.8 | 2.2 | 0.27 |
| Ex. 5 | o-Chlorobenzaldehyde—30, acetaldehyde—70 | 8.7 | 2.2 | 0.06 |
| Ex. 3 | m-Nitrobenzaldehyde—20, acetaldehyde—80 | 5.6 | 1.6 | 0.23 |
| Ex. 2 | m-Nitrobenzaldehyde—30, acetaldehyde—70 | 5.3 | 4.0 | 0.04 |
| Polyvinyl acetaldehyde acetal | | 9.1 | 5.0 | 0.42 |
| Do | | 9.7 | 1.0 | 0.59 |
| Polyvinyl acetaldehyde (70), benzaldehyde (30) acetal | | 9.3 | 2.0 | 0.36 |
| Polyvinyl acetaldehyde (70), benzaldehyde (30) acetal | | 8.6 | 2.0 | 0.36 |

From the above comparative data it is clear that my new resins have considerably improved moisture resistance over polyvinyl acetaldehyde acetal and polyvinyl acetaldehyde-benzaldehyde acetal resins. Film or sheet made from those of my new resins having swell and shrink amplitudes of less than 0.10 is especially useful for the manufacture of photographic film for aerial photography.

The swell and shrink amplitudes given above were determined in the following manner. Sample strips 15 inches long and 1½ inches wide were cut from the film or sheet. Usually two sample strips are cut lengthwise of the film or sheet and two sample strips are cut widthwise of the film or sheet. These strips are then perforated on a punch and die perforating machine with two holes approximately 10 inches apart. Usually two sets of perforations in each strip are made. Changes in dimensions of the strip owing to the action of moisture on the strip are then measured, measurements being taken from the outside edge of one hole to the outside edge of the other hole, approximately 10 inches removed from the first hole.

The strips are first conditioned at 50% relative humidity and then measured. The strips are then tacked loosely on a wooden rack and placed in a constant temperature thermostatically controlled water bath at 100° F. and left for 17 hours. The samples are then wiped to remove excess moisture and reconditioned at 50% relative humidity and then measured again and the dimensional change computed. Any dimensional change recorded here is not swell and shrink amplitude, but rather is what can be termed irreversible shrinkage. Any change occurring here is due to loss of solvent from the film or sheet and also due to release of mechanical strain. The strips are now placed in a water bath at 125° F. for 30 minutes, spacing them in and out a minute or so apart to allow for measuring. Care should be taken to measure as speedily as possible after the removal from the water after giving them a quick wipe with a towel to remove surplus water as shrinkage takes place almost instantly. The sample is then placed in an oven at 125° F. for one hour, then taken out and measured. This cycle is repeated three times or until the difference between the wet and dry readings becomes constant. The difference between the last wet and dry readings in percentage is the per cent swell and shrink amplitude. This test measures the permanent characteristic tendency of the film or sheet to swell and shrink under the influence of absorbed and desorbed moisture, the difference between the lengthwise and widthwise measurements representing the amount of non-uniformity in the structure lengthwise and widthwise.

My new resins can be pressed into blocks and skived to thin sheets or layers which can be used as a laminating material, e. g. between sheets of glass, particularly if suitably plasticized. My new resins are compatible with a number of plasticizers, such as tributylphosphate, triphenylphosphate, tricresylphosphate, diamylphthalate, dibutylphthalate, di- and triglycerol esters, such as acetates, propionates, butyrates and the like, monochlornaphthalene or the like.

My new resins can be successfully molded or extruded when suitably plasticized.

What I claim as my invention and desire to be secured by Letters Patent of the United States is:

1. A process for preparing a polyvinyl acetal resin containing a hydroxyl group content equivalent to not more than about 25 percent by weight of polyvinyl alcohol and an ester group content equivalent to not more than about 20 percent by weight of polyvinyl ester comprising reacting, in the presence of an acetal condensation catalyst, a polyvinyl compound selected from the group consisting of polyvinyl alcohols and partially deesterified polyvinyl esters with a plurality of aldehydes from about 20 to about 30 mole percent of said aldehydes being a benzaldehyde selected from the group consisting of halogenated and nitrated benzaldehydes and the remainder of said aldehydes being at least one saturated aliphatic aldehyde containing from one to four carbon atoms.

2. A process for preparing a polyvinyl acetal resin containing a hydroxyl group content equivalent to not more than about 15 percent by weight of polyvinyl alcohol and an acetate group content equivalent to not more than about 10 percent by weight of polyvinyl ester comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being a benzaldehyde selected from the group consisting of halogenated and nitrated benzaldehydes and the remainder of said aldehydes being at least one saturated aliphatic aldehyde containing from one to four carbon atoms.

3. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being a benzaldehyde selected from the group consisting of halogenated and nitrated benzaldehydes and the remainder of said aldehydes being acetaldehyde.

4. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being a chlorobenzaldehyde and the remainder of said aldehydes being acetaldehyde.

5. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being o-chlorobenzaldehyde and the remainder being acetaldehyde.

6. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being a nitrobenzaldehyde and the remainder of said aldehydes being acetaldehyde.

7. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 20 to about 30 mole percent of said aldehydes being m-nitrobenzaldehyde and the remainder of said aldehydes being acetaldehyde.

8. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 30 mole percent of said aldehydes being o-chlorobenzaldehyde and the remainder of said aldehydes being acetaldehyde.

9. A process for preparing a polyvinyl acetal resin containing a hydroxyl group content equivalent to not more than about 15 percent by weight of polyvinyl alcohol and an acetate group content equivalent to not more than about 5 percent by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 30 mole percent of said aldehydes being m-nitrobenzaldehyde and the remainder of said aldehydes being acetaldehyde.

10. A polyvinyl acetal resin containing a hydroxyl group content equivalent to not more than about 25 percent by weight of polyvinyl alcohol and an ester group content equivalent to not more than about 20 percent by weight of polyvinyl ester, the acetal groups of said resin consisting of about 20 to about 30 mole percent of acetal groups selected from the group consisting of halogenated benzaldehyde acetal groups and nitrated benzaldehyde acetal groups and the remainder of saturated aliphatic aldehyde acetal groups.

11. A polyvinyl acetal resin containing a hydroxyl group content equivalent to not more than about 15 percent by weight of polyvinyl alcohol and an ester group content equivalent to not more than about 10 percent by weight of polyvinyl ester, the acetal groups of said resin consisting of about 20 to about 30 mole percent of acetal groups selected from the group consisting of halogenated benzaldehyde acetal groups and nitrated benzaldehyde acetal groups and the remainder of saturated aliphatic aldehyde acetal groups.

12. A polyvinyl acetal resin containing a hydroxyl group content equivalent to not more than about 15 percent by weight of polyvinyl alcohol and an acetate group content equivalent to not more than about 10 percent by weight of polyvinyl acetate, the acetal groups of said resin consisting of about 20 to about 30 mole percent of acetal groups selected from the group consisting of halogenated benzaldehyde acetal groups and nitrated benzaldehyde acetal groups and the remainder of saturated aliphatic aldehyde acetal groups.

MARTTI SALO.